United States Patent [19]
Hoffmann et al.

[11] Patent Number: 4,893,410
[45] Date of Patent: Jan. 16, 1990

[54] CUTTERHEAD FOR A VEGETATION CUTTER

[75] Inventors: Joachim Hoffmann, Aichwald; Dieter Angstenberger, Leutenbach; Gerhard Zerrer, Korb, all of Fed. Rep. of Germany

[73] Assignee: Andreas Stihl, Waiblingen, Fed. Rep. of Germany

[21] Appl. No.: 273,925

[22] Filed: Nov. 21, 1988

[30] Foreign Application Priority Data

Nov. 20, 1987 [DE] Fed. Rep. of Germany ....... 3739269

[51] Int. Cl.$^4$ ............................................... B26B 7/00
[52] U.S. Cl. ......................................... 30/276; 56/12.7
[58] Field of Search .................. 30/276, 347; 56/12.7, 56/295

[56] References Cited

U.S. PATENT DOCUMENTS 4,493,151  1/1985  Mitchell ................................ 30/276
4,651,421  3/1987  Zerrer .

Primary Examiner—Frank T. Yost
Assistant Examiner—Willmon Fridie, Jr.
Attorney, Agent, or Firm—Walter Ottesen

[57] ABSTRACT

The invention is directed to a cutterhead for attachment to a vegetation cutting apparatus. The cutterhead has a housing with a spool on which a coil of cutting filament is wound. The cutting filament is paid out in incremental lengths when its ends effective for cutting are worn. This is achieved with an incremental rotation of the spool while the cutterhead rotates. For this purpose, the filament coil must have a winding rotation corresponding to the direction of rotation of the cutterhead. So that the cutterhead can be utilized for oppositely directed rotations as desired, the spool can be turned over through 180° and can be blocked and released in both positions by means of a switching member to provide the incremental rotation. The spool can be seated on the switching member and its position, when installed, is determined by means of a marking which is applied to the adapter nut and to the spool. The adapter nut serves to tighten the cutterhead onto the vegetation cutting apparatus.

11 Claims, 3 Drawing Sheets

CUTTERHEAD FOR A VEGETATION CUTTER

FIELD OF THE INVENTION

The invention relates to a cutterhead for a motor-driven vegetation cutter which defines a drive axis about which the cutterhead is rotatably driven. The cutterhead includes a housing which is adapted to be rotated by the vegetation cutter about the drive axis. A spool carrying the cutting filament coil is journalled in the housing and a switching member coacts with the coil to permit the latter to rotate incrementally to pay out incremental lengths of cutting filament.

BACKGROUND OF THE INVENTION

U.S. Pat. No. 4,651,421 discloses a cutterhead of the kind described above wherein the spool is axially fixed on an inner tubular piece and is provided with cams on one of its two flanges. These cams coact with stops of the switching member which is mounted in the housing in axially spaced relationship to the coil.

The filament coil on the spool must be wound in a direction corresponding to the rotational direction of the cutterhead if the cutting filament is to be paid out during rotation of the cutterhead when the ends of the filament effective for cutting are worn. The filament coil must therefore be initially wound for a predetermined direction of rotation of the cutterhead since its position within the housing is predetermined by the cams located on the flange of the spool. When the cutterhead is to be mounted on an apparatus having a drive connection which is configured for an opposite rotational direction of the cutterhead, then the filament spool must either be exchanged or the cutting filament must be unwound and then rewound in the opposite winding direction.

SUMMARY OF THE INVENTION

It is an object of the invention to provide a cutterhead which is configured so that its adaption for another rotational direction is substantially simplified.

The cutterhead of the invention is for a motor-driven vegetation cutter defining a drive axis about which the cutterhead is rotatably driven. The cutterhead includes: a housing adapted to be rotated by the vegetation cutter about the drive axis; the housing having a base and a side wall extending upwardly from the base to define an enclosed space; a spool rotatably journalled in the enclosed space, the spool having a hub for accommodating a coil of cutting filament thereon and having first and second flanges connected to respective longitudinal ends of the hub for delimiting the coil; indexing means for permitting an incremental rotation of the spool relative to the housing to pay out incremental lengths of the cutting filament; the indexing means including a switching member for receiving the spool thereon so as to cause one of the flanges of the spool to be adjacent the base and for imparting the incremental rotation to the spool; and, coupling means for coupling the spool to the switching member irrespective of which one of the flanges is adjacent the base when the spool is mounted on the switching member.

The arrangement according to the invention makes possible a simple reverse insert of the spool for adaptation to the predetermined rotational direction of the cutterhead.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
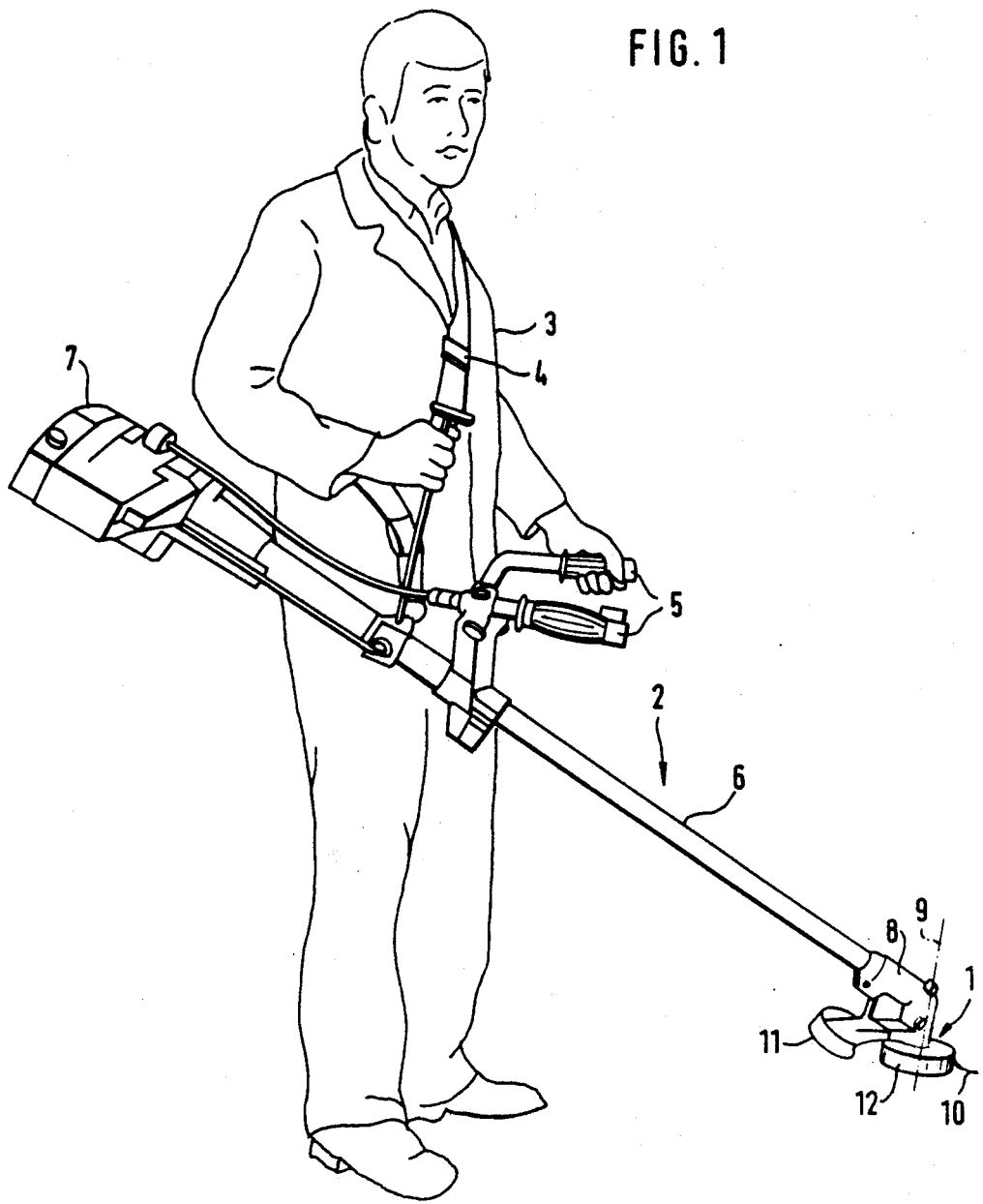
FIG. 1 is a schematic showing an operator carrying a vegetation cutter equipped with a cutterhead according to the invention.

FIG. 1 shows a vegetation cutting apparatus 2 equipped with a cutterhead 1. The apparatus is utilized for cutting or mowing grass, weeds and the like. The vegetation cutter is carried by an operator 3 by means of a shoulder belt 4 and is manually guided with handlebar-like holders 5 which are attached approximately at the center of the guide tube 6. A drive motor 7 is mounted at the upper end of the guide tube 6 and this motor can be configured as an internal combustion engine. At the lower end of the guide tube 6, an angle-shaped connection piece 8 is provided on which the cutterhead is releasably attached.

The cutterhead 1 is driven by the motor 7 via a drive connection disposed within the guide tube 6 and the cutterhead is rotated about an axis 9. A protective hood 11 is provided on the connection piece 8 of the cutting apparatus 2 for shielding against the cutting filament 10 extending out of the cutterhead 1. The protective hood 11 can be provided with a cut-off device for the cutting filament 10 which determines the upper limit value of the length effective for cutting.

Figure 2:
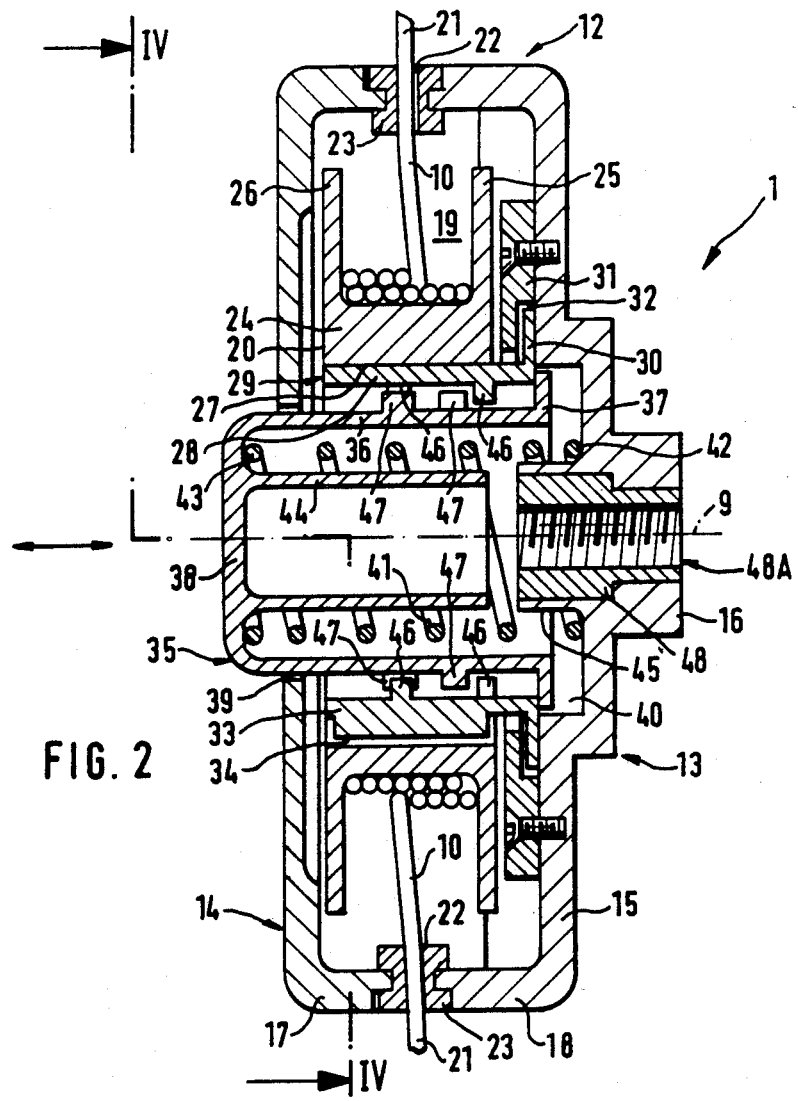
FIG. 2 is a side elevation view, enlarged and in section, of the cutterhead of FIG. 1.
Figure 3:
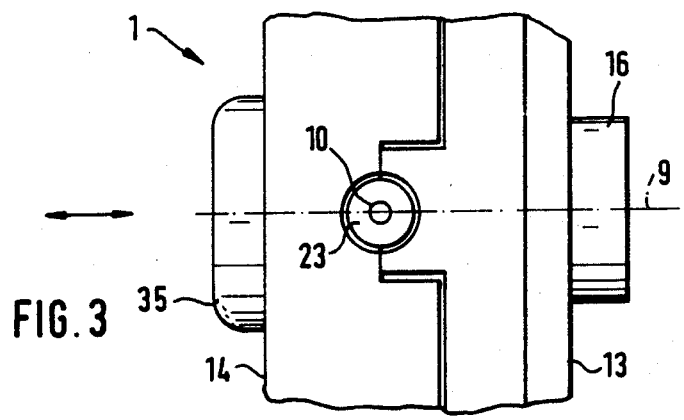
FIG. 3 is a side elevation view of a portion of the cutterhead of FIG. 2.

The cutterhead 1 has an approximately cylindrical housing 12 which includes a base body 13 and a cover 14 and is therefore configured as two parts. The base body 13 is cup-shaped and has a base 15 and a cylindrical side wall 18. The cover 14 is likewise cup-shaped and has a cylindrical wall 17 so that the housing has an overall cylindrical side wall. The respective edges of the base body 13 and cover 14 face each other and have a circular shape except for the region of two connecting projections. The respective edges of the base body 13 and of the cover 14 conjointly define the partition plane of the housing 12 (FIGS. 2 and 3). A hub 16 coaxial to axis 9 is formed on the base 15 of the base body 13. The cover 14 is substantially parallel to the base 15 and can be connected to the base body 14 via a snap closure located on the peripheral wall (17, 18) of the housing 12.

A spool 20 is located in the inner space 19 of the housing 12. The spool 20 is arranged so as to be coaxial with the axis 9 and is rotatably journalled. The cutting filament 10 is wound on the spool 20 and can be configured as a plastic cord.

The cutting filament 10 has two free ends 21 which are guided through bores 22 of two guide bushings 23 mounted in the housing wall (17, 18). The free ends 21 are held extended by centrifugal force during rotation of the cutterhead. The two bores thereby define guides for the cutting filament 10 at the transition locations whereat the cutting filament extends into the cutting ends 21. The bore axes of the two guide bushings 23 lie diametrically opposite each other and approximately in a center radial plane of the housing 12 and of the spool 20.

The spool 20 comprises a cylindrical carrying body or hub 24 and two flanges 25 and 26 which delimit the filament coil. A central hollow space 27 of the spool 20 is bounded by the hub 24. A sleeve 28 of a switching member 29 is mounted in this hollow space 27. The sleeve 28 has an end flange 30 at its end facing toward the base 15 of the base body 13. The end flange 30 lies in an annular slot 32 conjointly defined by base 15 and an overlapping annular member 31 which is fastened to base 15 by threaded fasteners.

The switching member 29 and the spool 20 are releasably connected. For this purpose, a spline 33 is formed on the sleeve 28 of the switching member 29 which engages a longitudinal slot 34 of the spool hub 24. The spool 20 is configured so as to be mirror symmetrical to its radial center plane so that it can be turned over by 180° and mounted on the sleeve 28 of the switching member 29 with the end face of the spool flange 25 then facing toward cover 14.

A switching sleeve 35 is arranged within the switching member 29 coaxially to axis 9. The switching sleeve 35 is cup-shaped and has a cylindrical wall 36, a flange 37 facing the base 15 of the base body 13 and a cover wall 38. The switching sleeve 35 is axially displaceable against the force of a helical compression spring 41 by means of a force applied to its cover wall 38. The switching sleeve 35 extends through an opening 39 of the cover 14. The flange 37 of the switching sleeve 35 is disposed in a recess 40 formed in the base 15 of the base body 13 and engages the switching member sleeve 28 at its end flange 30 from below. The recess 40 and the flange 37 are configured so as to have several flats, for example, four flats so as to be square in cross section. In this way, the switching sleeve 35 is held to prevent rotation thereof relative to the base body. The recess 40 is so dimensioned that the switching sleeve 35 can be axially displaced by an appropriate amount.

The helical spring 41 is disposed within the switching sleeve 35 and is braced against the cover wall 38 of the sleeve 35 with its one spring end 43 while the other spring end 42 is braced at the base of the recess 40. For axially guiding the spring 41, a first tubular projection 44 is formed on the inner side of the cover wall 38 and a second tubular projection 45 is formed on the base 15 of the base body 13 as an extension of the hub 16. The two tubular projections 44 and 45 lie opposite each other.

An attachment nut 48 mounted so as to be held to prevent rotation is disposed in the tubular projection 45. The attachment nut 48 attaches the cutterhead 1 to the connection piece 8 (FIG. 1). In accordance with the rotational direction of the cutterhead drive, the nut 48 can be provided with a right-hand winding or a left-hand winding so that this attachment nut constitutes an adapter which considers the rotational direction of the cutterhead. As an adapter, an attachment nut can always be used which has a right-hand winding or a left-hand winding and is selected such that the cutterhead 1 tightens itself at the threaded connection during rotation. These nuts 48 provided as adapters are each provided with marking means in the form of an inscription 48A for identifying the intended rotational direction. For example, "L" can be provided as an inscription for left-hand rotation and "R" can be provided for right-hand rotation with the inscription being discernible from the outside on a completely assembled cutterhead. The adapter nut 48 should be as short as possible in order to reduce its weight and thereby the overall weight of the cutterhead 1. The adapter nut 48 can become somewhat axially displaced during mounting of the cutterhead on the connection piece 8 of the apparatus. The displacement path is limited by the tubular projection 44 which is configured to have an appropriate length and axially braces the adapter nut 48 during assembly.

At the inner wall surface of sleeve 28 of the switching member 29, a plurality of cams 46 are provided approximately at the center and these cams are distributed on the inner periphery and arranged in two different planes (FIG. 2).

In each of the two planes, two cams 46 lying diametrically opposite each other can be provided or four such cams can be provided which lie opposite each other in pairs. Stops 47 for the cams 46 are provided at the cylindrical wall 36 of the switching sleeve 35. The stops 47 are distributed over the periphery and are likewise mounted in two different planes axially spaced from each other. The axial spacing between the stops 47 is less than the axial spacing between the cams 46. The spacings are so selected that for the operational position shown in FIG. 2, only the cams 46 and the stops 47 lying closer to the housing cover 14 can be brought into abutting engagement with each other. The cams 46 and the stops 47 which are in abutting engagement in FIG. 2 are disengaged when the switching sleeve 35 is axially pressed inwardly against the force of the helical pressure spring 41. After the switching sleeve has been displaced through a predetermined axial positioning path, the stops 47 lying closer to the base 15 reach the region of the cams 46 also disposed closer to the base 15. During the time that the switching sleeve 35 passes through this axial displacement path, the spool 20 undergoes an incremental rotation about axis 9 under the pulling force acting on the cutting filament 10 so that the ends 21 of the cutting filament 10 which are effective for cutting are lengthened by a predetermined amount.

The guide bushings 23 together with their bore axes are likewise approximately in the radial center plane of the spool 20 (FIGS. 2 and 3). The guide bushings 23 are seated in respective tabs of the wall of the base body 13 and in the wall of the cover 14 with the cover wall at this location defining a recess in which the tab engages to form a good fit (FIG. 3).

Since the switching member 29 is a component separate from the spool 20, the spool 20, after removal of the housing cover 14, can itself be pulled out of the base body 15 and, after being turned over through 180°, can be reinserted. When pulling out the spool 20, the slot-spline connection between the spool 20 and the switching member 29 is separated and when the spool is again seated in the position it acquires after being turned over 180°, the slot-spline connection is again reestablished when the spool is inserted without any special manipulation. The winding direction of the filament coil with respect to the disposition of the cutterhead 1 is changed by turning the spool over. Therefore, the same spool can be used for both possible rotational directions of the cutterhead without having to unwind the cutting filament and again rewinding the same in another winding direction. The spool 20 is preferably marked with "L" and "R" at respective flanges 25 and 26 just as the adapter nut so that the marking facing toward the housing cover indicates whether the winding direction of the cutting filament is for left-hand rotation or for right-hand rotation of the cutterhead.

The operator recognizes the information "R" or "L" on the adapter nut and transfers the same to the spool which is inserted into the base body 13 so that it corresponds with the marking of the adapter nut which markings "R" and "L" are visible on the flange of the spool facing toward the cover.

FIG. 2 is a somewhat modified embodiment which shows that for a slot-spline connection between the spool 20 and the switching member 29, the slot 34 can be provided on the spool and the spline 33 can be provided on the sleeve 28 of the switching member 29.

Figure 4:
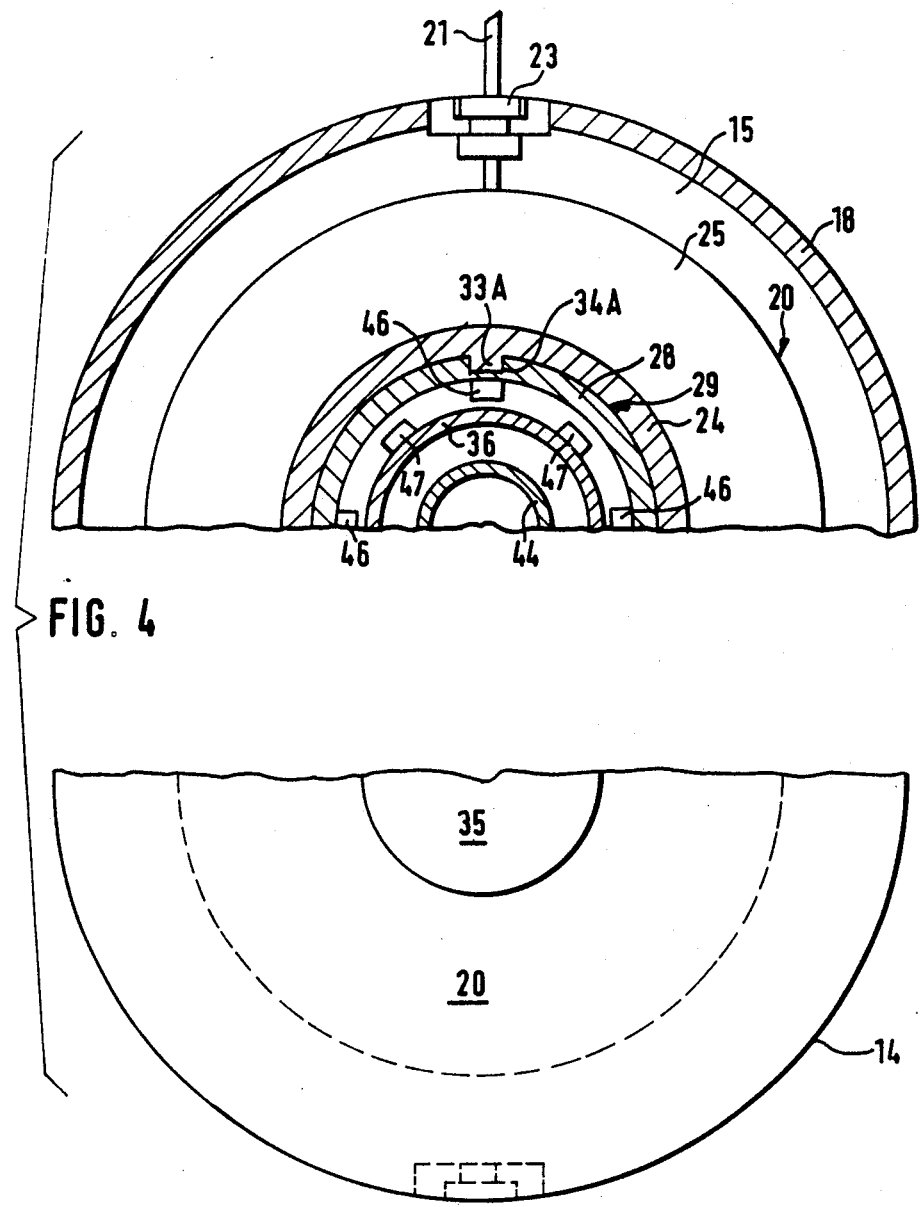
FIG. 4 is a composite section and plan view taken along line IV—IV of FIG. 2 showing a somewhat modified configuration of the connection between the spool and the switching member.

In order to have the smallest possible outer diameter of the spool hub 24 and thereby a large filament coil volume, the arrangement of the slot and spline can also be selected so as to be opposite to that shown in FIG. 2. This is illustrated schematically in FIG. 4. In this embodiment, the sleeve 28 of the switching member 29 is provided with an axial slot 34A at its outer side and the spool 20 has a lug 33A forming the spline on its cylindrical hub 24 which engages the slot 34A.

It is understood that the foregoing description is that of the preferred embodiments of the invention and that various changes and modifications may be made thereto without departing from the spirit and scope of the invention as defined in the appended claims.

What is claimed is:

1. A cutterhead for a motor-driven vegetation cutter defining a drive axis about which the cutterhead is rotatably driven, the cutterhead comprising:
   a housing adapted to be rotated by the vegetation cutter about said drive axis;
   said housing having a base and a side wall extending upwardly from said base to define an enclosed space;
   a spool rotatably journalled in said enclosed space, said spool having a hub for accommodating a coil of cutting filament thereon and having first and second flanges connected to respective longitudinal ends of said hub for delimiting said coil;
   indexing means for permitting an incremental rotation of said spool relative to said housing to pay out incremental lengths of the cutting filament;
   said indexing means including a switching member for receiving said spool thereon so as to cause one of said flanges of said spool to be adjacent said base and for imparting said incremental rotation to said spool;
   said indexing means further including: an indexing member for coacting with said switching member to provide said incremental rotation; said switching member and said indexing member being mounted in said housing so as to be displaceable relative to each other; first and second cam means formed on said switching member so as to be spaced from each other; and, first and second stop means mounted on said indexing member so as to be spaced from each other so as to cause one of said cam means to coact with one of said stop means with each displacement of said switching member and indexing member relative to each other thereby effecting said incremental rotation of said spool; and,
   coupling means for coupling said spool to said switching member irrespective of which one of said flanges is adjacent said base when said spool is mounted on said switching member.

2. The cutterhead of claim 1, said hub and said switching member conjointly defining an interface when said spool is mounted on said switching member, said coupling means comprising a spline-slot connection at said interface for releasably coupling said switching member and said spool to each other.

3. The cutterhead of claim 2, said hub and said switching member defining respective longitudinal axes coincident with said drive axis; and, said slot and said spline both extending in a direction parallel to said drive axis.

4. The cutterhead of claim 2, said slot being formed on said hub of said spool and said spline being formed on said switching member.

5. The cutterhead of claim 2, said slot being formed on said switching member and said spline being formed on said hub of said spool.

6. The cutterhead of claim 1, wherein at least one end portion of said coil is unwound and said cutterhead further comprising guide means disposed in said side wall and defining a bore for guiding said end portion to the outside; and, said guide means being mounted in said side wall at an elevation of a plane approximately mid way between said first and second flanges.

7. The cutterhead of claim 1, said housing having a hub formed on said base; and, said cutterhead further comprising a threaded attachment nut for threadably attaching said cutterhead to said vegetation cutter; said hub defining a holder for accommodating said nut therein; and, marking means formed on said attachment nut to identify the direction of the thread of said nut so as to indicate whether said thread is a right-hand thread or a left-hand thread.

8. The cutterhead of claim 7, comprising ancillary marking means formed on at least one of said first and second flanges for identifying the direction in which said coil is wound on said hub.

9. The cutterhead of claim 1, comprising marking means formed on at least one of said first and second flanges for identifying the direction in which said coil is wound on said hub.

10. A cutterhead for a motor-driven vegetation cutter defining a drive axis about which the cutterhead is rotatably driven, the cutterhead comprising:
    a housing adapted to be rotated by the vegetation cutter about said drive axis;
    said housing having a base and a side wall extending upwardly from said base to define an enclosed space;
    a spool rotatably journalled in said enclosed space, said spool having a hub for accommodating a coil of cutting filament thereon and having first and second flanges connected to respective longitudinal ends of said hub for delimiting said coil;
    indexing means for permitting an incremental rotation of said spool relative to said housing to pay out incremental lengths of the cutting filament;
    said indexing means including a switching member for receiving said spool thereon so as to cause one of said flanges of said spool to be adjacent said base and for imparting said incremental rotation to said spool;
    coupling means for coupling said spool to said switching member irrespective of which one of said flanges is adjacent said base when said spool is mounted on said switching member; and, said hub and said switching member conjointly defining an interface when said spool is mounted on said switching member, said switching member being a cylindrical sleeve having an outer surface at said interface and an inner surface defining a cylindrical space; said indexing means further comprising first and second cam means formed on said inner surface so as to be axially spaced from each other; a switching sleeve mounted in said housing so as to be axially displaceable in said cylindrical space; and, first and second stop means mounted on said switching sleeve so as to also be axially spaced from each other so as to cause one of said cam means to coact with one of said stop means with each axial displacement of said switching sleeve thereby effecting said incremental rotation of said spool.

11. The cutterhead of claim 10, said indexing means further comprising annular gap means formed on said base; and, said switching sleeve having an end flange formed thereon and extending outwardly from said switching sleeve so as to be in engagement with said annular gap means.

* * * * *